United States Patent [19]

Anderson et al.

[11] Patent Number: 4,851,666
[45] Date of Patent: Jul. 25, 1989

[54] OPTICAL FLOW METER

[75] Inventors: John C. Anderson, Houston; Morris J. Davies, Stafford, both of Tex.

[73] Assignee: Leslie Controls, Inc., Tampa, Fla.

[21] Appl. No.: 585,579

[22] Filed: Mar. 2, 1984

[51] Int. Cl.[4] .................. G01F 1/10; G01D 5/28
[52] U.S. Cl. ..................... 250/231 R; 73/861.77; 250/227
[58] Field of Search ............ 250/227, 231 SE, 231 R; 340/347 P; 73/861.79, 861.77

[56] References Cited

U.S. PATENT DOCUMENTS

| | | | |
|---|---|---|---|
| 4,377,086 | 3/1983 | Linder et al. | 250/227 |
| 4,428,243 | 1/1984 | Taylor | 73/861.77 |
| 4,433,583 | 2/1984 | Kirk | 73/861.77 |
| 4,500,870 | 2/1985 | Krohn et al. | 250/231 SE |

Primary Examiner—Edward P. Westin
Attorney, Agent, or Firm—Harrison & Egbert

[57] ABSTRACT

An optical flow meter comprising a source of light, an optical fiber, a connector, a detector, and output electronics. The optical fiber is connected to the source of light so as to transmit light therethrough. The connector is arranged for attaching the optical fiber in a position generally adjacent to a rotating body. The detector is a photodetector that is arranged to receive light from the optical fiber after the light is reflected by the rotating body. The source of light is a light-emitting diode. The optical fiber is a single optical path. A lens is disposed generally about one end of the optical fiber for directing and focusing light relative to the rotating body. The end of the optical fiber is sealed so as to isolate the end of the fiber from the environment of the rotating body. A beamsplitter is included as an optical coupler between the light-emitting diode, the optical fiber, and the photodetector.

8 Claims, 3 Drawing Sheets

OPTICAL FLOW METER

FIELD OF THE INVENTION

The present invention relates to optical devices for measuring the rotation of a rotating body. More particularly, the present invention relates to fiberoptic systems for measuring fluid flow by the speed of rotation of a turbine that is interactive with the fluid flow.

BACKGROUND ART

Fiberoptics is the branch of physics concerned with the propagation of light that enters a thread or rod of transparent material at one end and is totally reflected back inward from the wall, thereby being transmitted within the fiber from one end to the other. Fiberoptics is widely applied in medical practice to observe the human body internally. Fiberoptic fibers have also been used to transmit light signals carrying information from both electronic and optical sensors.

In the chemical industry, flow rate measurement is essential in controlling all phases of processing and in determining the material balance for processing units. Once manufactured, the transmission of materials through pipelines between distant places calls for an accurate measurement of flow rate. A multiplicity of techniques is used in this measurement. Flow rate may be determined by measuring the change in pressure caused by either a constriction in a pipe or the insertion of a disk within an orifice into the flow stream. Measuring the impact pressure upon a probe inserted into the process stream will yield the flow rate, as would measuring change in pressure resulting from a change in the direction of this stream. It is also possible to derive the flow rate by measuring the change in the velocity of sound as it passes through the material.

A common flow-rate measuring device is the orifice meter. A plate with a circular orifice at the center is inserted into the process stream, causing the fluid as it passes through the orifice to increase in velocity and correspondingly decrease in pressure. A differential-pressure measuring device measures the fluid pressure just before and just beyond the orifice. Knowledge of this differential pressure allows calculation of the flow rate. This type of flow meter is the most widely used because it is simple and has been long established in plant processes.

One of the most widely used methods is the turbine flow meter. A turbine rotor is allowed to rotate freely in the moving fluid, and its rotation causes a sudden distortion in the field of a small, powerful magnet located in a sensor unit outside the pipe. This distortion generates an alternating-current voltage that is transmitted to a small computer. The computer analyzes this information and calculates and displays the flow rate.

These devices measure the volume-flow rate. This knowledge is useful in monitoring, for instance, the blending of two fluids the density of which are known, such as gasoline and tetraethyllead. In other cases, such as that in which a large quantity of raw material is being transmitted by pipeline and sold by weight, determination of the mass-flow rate is vital. This may be found by adding to a volume flow meter a device that measures the density of the material and calculates mass flow from these two measurements.

There are also flow meters that directly measure mass-flow rate. One of these utilizes two turbines in the flow stream, the first of which, driven at a constant speed, acts as an impeller and imparts a certain velocity to the fluid, depending on the fluid's mass. The second turbine located downstream is adjusted to slow the flow to its original rate; in doing so it receives a torque, or turning force, proportional to the force of the flow (angular momentum). The turbine deflects a spring at an angle proportional to the torque exerted upon it by the fluid. The result is a very accurate and direct measure of the mass flow.

While many systems have been available for the measurement of fluid flow, it is not believed that these systems have usefully incorporated fiberoptics for the transmission of such information. Furthermore, no systems herein before have utilized single optical pathways for the transmission of information to and from the fluid flow being measured. In addition, it is believed that none of the prior art devices have utilized a single optical pathway for the measurement of the rotation of a rotating body, such as a turbine, regardless of the need to measure the fluid flow therein.

It is an object of the present invention to provide an optical flow meter that is inherently safe even in the most hazardous of environments.

It is another object of the present invention to provide a optical flow meter that imparts no electrical disturbances on or about the fluid flow.

It is still another object of the present invention to provide an optical flow meter that is more accurate and reliable than traditional magnetic pickups.

It is still a further object of the present invention to provide an optical flow meter that is adaptable for the measurement of the speed of rotation of a rotating body.

These and other objects and advantages of the present invention will become apparent from a reading of the attached specification and appended claims.

DISCLOSURE OF THE INVENTION

The present invention is an optical device for the measuring of the rotation of a rotating body comprising: a source of light, an optical fiber for transmitting light from the source of light to a location distant from that light, a connector for attaching the optical fiber in position generally adjacent the rotating body, a detector arranged so as to receive light from the optical fiber after the light has been reflected from the rotating body, and suitable output electronics electrically connected to the detector for producing a signal that is relative to the light as received by the detector. In this invention, the source of light is a light-emitting diode that is electrically connected to a constant direct current source. The optical fiber comprises a single optical pathway. This optical fiber includes a lens disposed generally about one end of the optical fiber opposite the source of light. This lens is designed so as to direct light to and receive light from the rotating body. Ideally, this lens is collimating lens.

The detector of the present invention is a photodetector that is positioned relative to the optical fiber so as to be electrically responsive to light that is emitted by the optical fiber. The light that is emitted by the optical fiber is the light that is reflected by the rotating body. This detector further includes an amplifier that is electrically connected to the photodetector and a pulse shaping circuit that is electrically connected to the amplifier for converting the signal from the amplifier into a digital pulse. The output electronics of the present invention includes a pulse forming circuit for providing a constant pulse width from the leading edge of the signal from the pulse shaping circuit. In application, this pulse forming circuit allows measurable and uniform pulses to be generated relative to the rotation of the rotating body. The present invention also includes a beamsplitter that is disposed about the light source, the optical fiber, and the photodetector. This beamsplitter passes light from the source of light to the optical fiber and passes light from the optical fiber to the photodetector.

BEST MODE FOR CARRYING OUT THE INVENTION

Figure 2:
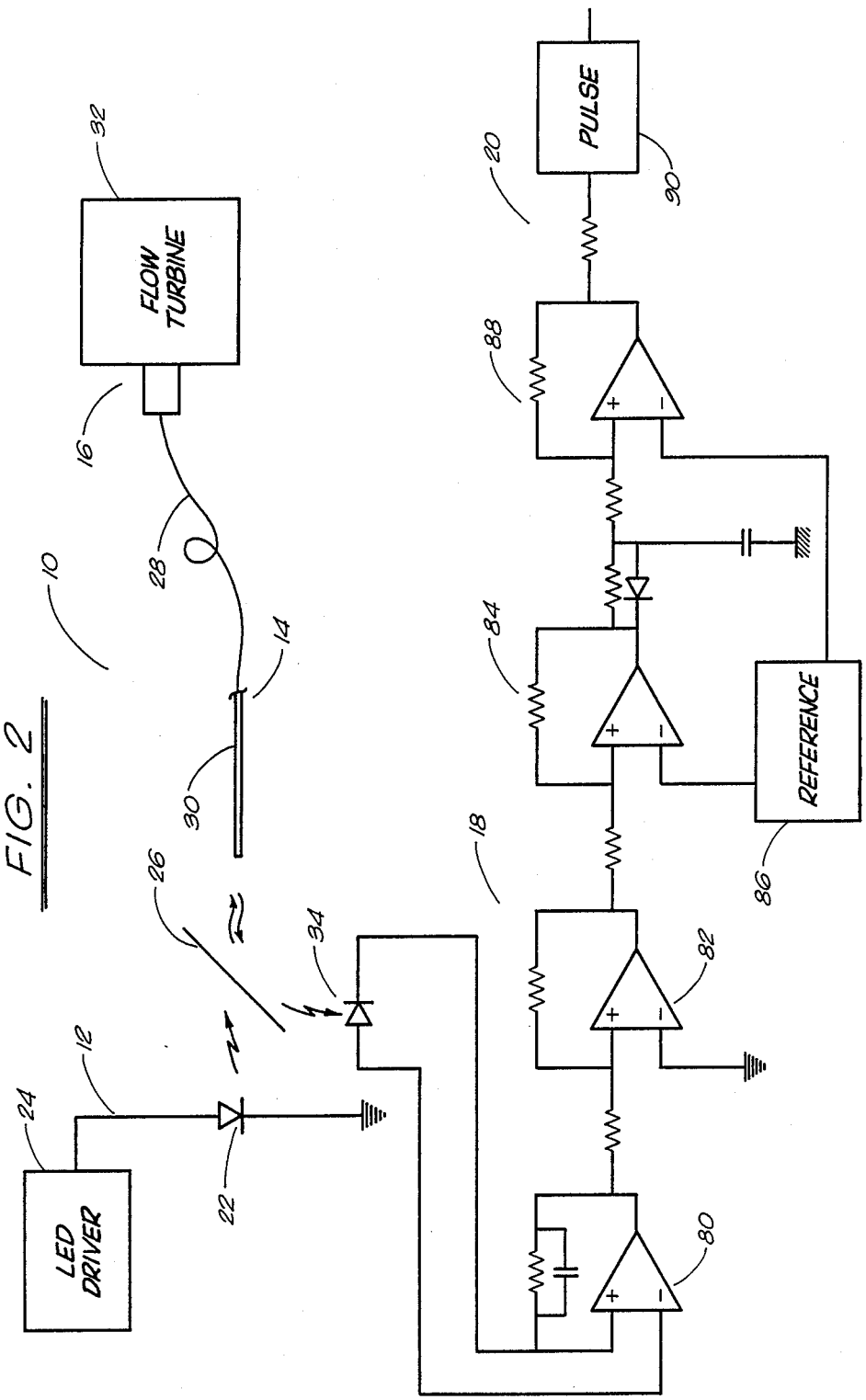
FIG. 2 is a schematical representation of the electronics in operation of the present invention.

Referring to FIG. 2, there is shown at 10 the optical flow meter in accordance with the present invention. As seen in FIG. 2, optical flow meter 10 includes light source 12, fiberoptic means 14, connector means 16, detector means 18, and output means 20.

Light source 12 includes a light-emitting diode 22. Light-emitting diode 22 is a semiconductor device that produces a visible or invisible luminescence when a voltage is applied to it. The power for light-emitting diode 22 is provided by LED driver 24. LED driver 24 provides a stabilized output current to the light-emitting diode 22. It is powered by a precision constant direct current source.

Light-emitting diode 22 is connected and coupled to beamsplitter 26. Beamsplitter 26 includes a housing that contains the beamsplitter and receives the light-emitting diode 22, the optical fiber 28, and the detector components of the present invention. Specifically, beamsplitter 26 is an optical arrangement that reflects part of the beam of light and transmits part of that beam of light. The fiberoptics 14 are arranged such that the optical fiber 28 receives the light as transmitted by light-emitting diode 22. In the preferred embodiment of the present invention, these components are arranged such that light will be transmissive therebetween. In other words, light from light-emitting diode 22 should pass through the beamsplitter and be received by optical fiber 28 within casing 30. The light returning through fiberoptics 14 from the flow turbine 32 is reflected off beamsplitter 26 and is received by photodetector 34.

Fiberoptics 14 is a single optical path extending from beamsplitter 26 to connector 16 of flow turbine 32. Optical fiber 28 is a type of transmission media that allows light to be transmitted long distances and around corners with little loss and without interference from other light sources. Optical fiber 28 is a very thin tube of quartz, glass, or plastic which is designed to transmit a beam of light from one end to the other by essentially reflecting it from side to side as it travels down the fiber. In accordance with the present invention, fiberoptics 14 comprises a single optical fiber pathway. One end of fiberoptics 14 is coupled to the beamsplitter 26 and arranged so as to receive light from light-emitting diode 22. The light from light-emitting diode 22 will travel along optical fiber 28 to its other end within connector 16. Many individual optical fibers 28 may be joined, in end-to-end relationship, to form the single optical pathway. As a result, optical fiber 28 may have a length as long as several kilometers. This maximizes the distance between the electrical circuitry of the present invention and the potentially hazardous environment of flow turbine 32.

Figure 1:
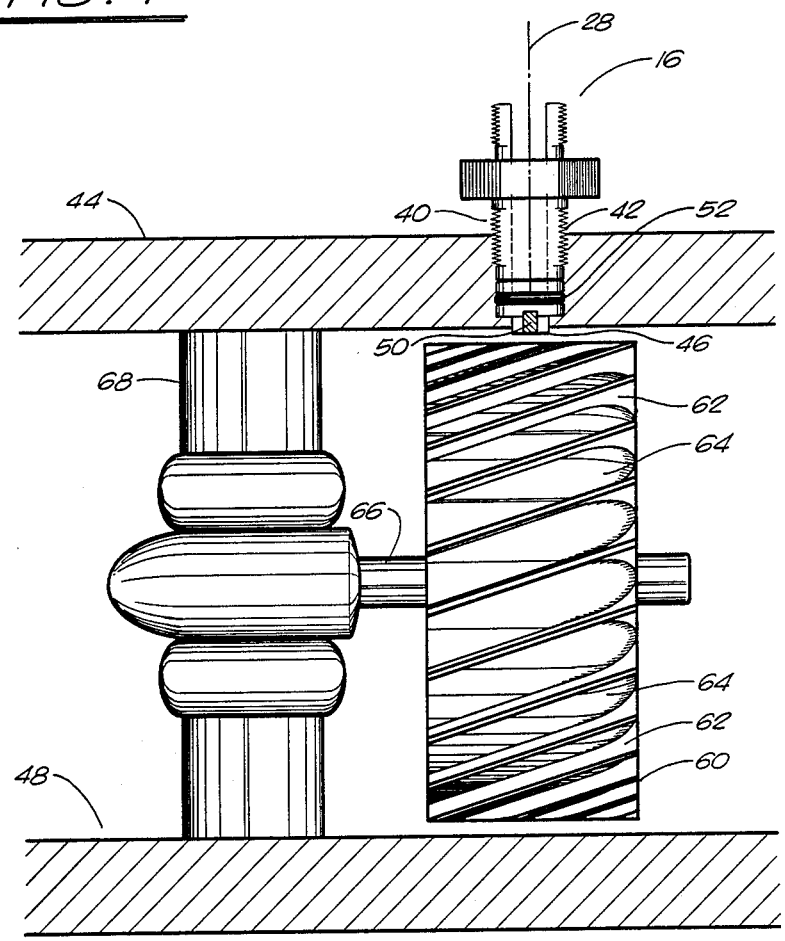
FIG. 1 is a cross-sectional view in side elevation of the optical device in combination with the turbine in accordance with the present invention.

Fiberoptics 14 is interconnected with flow turbine 32 by connector 16, as is illustrated in FIG. 1. In FIG. 1, connector 16 is comprised of a housing 40. Housing 40 is a generally cylindrical member having an internal cavity extending thereto for the receipt of fiberoptics 14. Housing 40 includes a threaded section 42 that is received by a correspondingly threaded section within pipeline 44. The opening within pipeline 44 that receives connector 16 is arranged so as to receive connector 16 and allow the end 46 of connector 16 to enter the interior 48 of pipeline 44. A hexagonal nut 50 generally surrounds the outer diameter of body 40. Nut 50 allows connector 16 to be fastened into the opening within pipeline 44.

A housing that contains lens 50 occurs about end 46 of connector 16. An elastomeric O-ring 52 is disposed in a groove between housing 40 and the housing that contains the lens 50. O-ring 52 is included to isolate the interior 48 of pipeline 44 from the exterior environment. Lens 50 is sealed within body 40 of connector 16 to 10,000 p.s.i. This pressurized sealing should be of sufficient strength to adequately protect optical fiber 28 from the rigors of the fluid passing through and the environmental conditions within pipeline 44.

Within the interior of pipeline 44 is a turbine 60. Turbine 60 has blades 62 extending thereacross. Blades 62 are somewhat elevated from the surface 64 of rotor 60. Turbine 60 is mounted onto axle 66. Axle 66 is received by and extends generally about flow straightening vanes 68. Depending on the embodiment desired of the present invention, turbine 60 can either be a freely-moving turbine that is rotated purely by the flow of fluid therethrough, or, it may be a rotor that is powered by some external force. The optical flow meter 10 of the present invention is adaptable to a wide variety of configurations. The main purpose of the optical flow meter is to measure the rotational speed of the turbine. Since it measures the rotational speed of the turbine, regardless of the type of force acting on the turbine, it is suitable for measuring both flow turbines, turbines that are powered by external force, or any other type of bladed arrangements. The example shown in FIG. 1, is merely one example of the many embodiments of the present invention to which the optical flow meter is adaptable.

Figure 3:
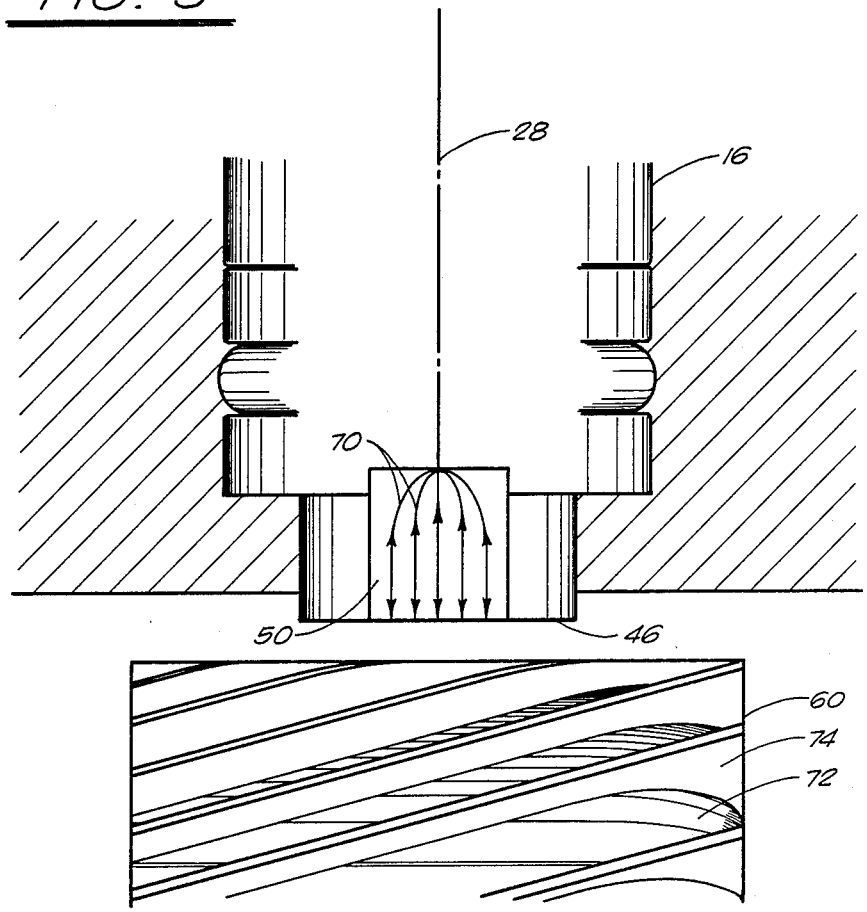
FIG. 3 is a close-up view of the optical fiber and lens as used in position relative to the spinning turbine.

As can be seen in the close-up view of FIG. 3, lens 50 is a collimating lens. In other words, the lens is designed to receive the light from optical fiber 28 and collimate it so as to produce parallel rays of light passing from end 46. These parallel rays of light 70 are directed toward the surface 72 of turbine 60. The surface 72 of turbine 60 also includes blades 74. As will be described hereinafter, in operation, these parallel rays of light 70 are reflected from either surface 72 or blades 74 back toward collimating lens 50. These reflected rays of light are received by the collimating lens and focused back into optical fiber 28. Since the amount of light reflected back into optical fiber 28 is a function of the distance of the reflective surface from the end 46 of lens 50, more light will be reflected back into the optical fiber when the edge of blade 74 is adjacent end 46 than will be when surface 72 is adjacent end 46. In this manner, accurate measurements of the speed of rotation of turbine 60 are accomplished.

Referring back to FIG. 2, the detection and output circuitry of the present invention are described hereinafter. Detector 18 is comprised of photodetector 34, transconductance amplifier 80, voltage amplifier 82, rectifier 84, adaptive reference circuit 86, and Schmitt trigger 88. Photodetector 34 receives the light transmitted from flow turbine 32 by fiberoptics 14. Photodetector 34 converts this light input into an electrical output. In this arrangement, photodetector 34 transmits an AC signal to transconductance amplifier 80. Tranconductance amplifier 80 is electrically connected to photodetector 34 and converts the current from photodetector 34 into a voltage. This voltage is a function of the power of the light hitting photodetector 34. In this manner, as more light is reflected by portions of the turbine 60 into optical fiber 28, the greater amount of voltage will be transmitted by transconductance amplifier 80. Voltage amplifier 82 is electrically connected to transconductance amplifier 80. Voltage amplifier 82 elevates the voltage produced by transconductance amplifier 80 into a level that is suitable for working with. Rectifier 84 converts the AC input into a DC output. Schmitt trigger 88 is electrically connected to rectifier 84 and to reference circuit 86. This trigger circuit 88 produces an output of fixed amplitude and duration. This circuitry acts as a filter in eliminating many of the problems caused by minor variations in voltage. The reference circuit 86 is also electrically connected to both the rectifier 84 and the trigger circuit 88. This reference circuit 86 follows the DC level produced by the rectifier and assists in the usage of small voltage signals. Together, rectifier 84, reference circuit 86, and trigger circuit 88 converts the wave form produced by the interaction of the photodetector and the fiberoptics into a DC digital pulse. In essence, this produces a square pulse train. These devices also solve many of the problems associated with interference, misshapen pulses, and variations in fluid viscosity passing through flow turbine 32.

The output circuitry 20 of the present invention includes pulse forming circuit 90. Pulse former 90 is a circuit that is electrically connected to the detector circuitry 18 of the present invention. The design of such a pulse former is well-known in the art of electronics. This pulse forming circuit 90 is adapted to produce a constant pulse width that starts with the leading edge of the square wave form from the Schmitt trigger 88. This pulse forming circuit gives a precision wave form for use by a computer or a D.C. meter. In use, this device produces electrical "blips" that correspond to the occurrence of a turbine blade 74 adjacent to the end of the fiberoptics 14. The number of turbine blade passes can be counted in this manner. This figure could be passed as output from this pulse forming circuit 90 and can be used to calculate the rate of rotation of the turbine blade, the fluid flow rate through the turbine blade, or any other calculation that requires knowledge of the rate of turbine rotation. Also, this standard digital pulse output can be electrically connected to a computer so as to produce a flow rate that corresponds to the average electrical output.

In operation, light source 12, and in particular light-emitting diode 22, produces a constant light output toward one end of optical fiber 28. This light is transmitted through the optical fiber 28 into the connector 16 within flow turbine 32. At its other end, optical fiber 28 is connected to a collimating lens 50. Collimating lens 50 causes parallel rays of light to be emitted from the end of optical fiber 28 and directed toward the surface of turbine 60. When a bladed portion 62 of turbine 60 passes adjacent to the end 46 of connector 16, a portion of the light emitted from optical fiber 28 is reflected back toward lens 50. The lens 50 receives this light and focuses this light into the end of optical fiber 28. The bladed portion 62 reflects a greater amount of light than the non-bladed portion 64. Optical fiber 28 then passes this light information back toward beamsplitter 26 and into photodetector 34. Photodetector 34 receives the light transmitted by fiberoptics 14 and converts this light input into an electrical current output. Transconductance amplifier 80 receives this current output and converts this current output into a voltage output. This voltage is a function of the power of the light hitting photodetector 34. Voltage amplifier 82 receives the output from transconductance amplifier 80 and converts this into a voltage level that is suitable for working with. Rectifier 84, reference circuit 86, and Schmitt trigger 88, receive this voltage from amplifier 82, filter it, and convert it into a digital pulse. The digital pulse passes from Schmitt trigger 88 into pulse forming circuit 90. Pulse forming circuit 90 receives this pulse and converts it into a pulse of constant width that starts with the leading edge of the square wave delivered by Schmitt trigger 88. This standard digital pulse output from pulse forming circuit 90 can then be passed to suitable electronics for use by a computer, by human observation, or for other detection circuitry.

It should be noted here, that when the surface 64 of turbine 60 is adjacent the end 46 of connector 16, a lesser amount of light is reflected back into he end 46 and into optical fiber 28. This is because a greater amount of the light is deflected within pipeline 48 and away from the lens 50. As a result, a lesser amount of light is transformed into a voltage acting on the Schmitt trigger. The location of the turbine blade in this situation could be considered as the lower part on a square wave form. In essence, the pulse produced by the detection circuitry of the present invention would have a high amplitude when the turbine blade 74 is adjacent the optical fiber and would have a low amplitude when the surface 72 of turbine 60 would be adjacent the optical fiber. By counting the number of high amplitudes, a calculation as to the rate of rotation of turbine 60 can be performed.

As an example, if turbine 60 would have five blades, then five pulses would be created on each rotation of the turbine. The turbine speed in rotations per second could be calculated by taking a count on the number of pulses per second and dividing the total pulses by the five turbine blades. Similarly, the rate of rotation of the turbine blade can be analyzed so as to calculate and display the flow rate of a fluid through the pipeline.

The present invention offers significant advantages over the traditional magnetic pickups used to calculate the rotational rates of a turbine within a fluid. The magnetic pickups have exhibited 7 to 9 percent losses and inaccuracies when the turbine is moving with a slow rate of rotation. At slow rates of rotations, the wave form generated by the interaction of magnetic fields is relatively flat. This makes it harder to analyze the blade movement, and as a result, more difficult to calculate turbine rotation. In addition, traditional magnetic pickups require the use of electricity in a potentially hazardous environment. The present invention, through the use of fiberoptics and light transmission, is inherently safe even in the most explosive of environments. Since the electronics of the present invention can be located at a distance remote from the fluid flow being measured, the electricity can be effectively isolated from the hazardous environment. Finally, by producing the pulse relative to the leading edge of the blade, the present invention provides a standard digital pulse output hat can be utilized by other systems and is very accurate with regard to blade detection and turbine movement.

The present invention is also unique and advantageous through its use of the single optical fiber transmission medium. The incorporation of the single fiber with the beamsplitter arrangement eliminates the need for fiberoptic bundles and the electronics associated with each bundle. This produces a great cost savings, a significant improvement in reliability, and a reduction in repair and maintenance.

The foregoing disclosure and description of the invention is illustrative and explanatory thereof, and various changes in the size, shape, and material, as well as in the details of the illustrated construction and described method of operation, may be made within the scope of the appended claims without departing from the spirit of the invention. This invention should only be limited by the appended claims and their equivalents.

We claim:

1. An optical device for measuring the flow rate of a fluid through a pipe comprising:
    a source of light;
    fiberoptic means for transmitting light from said source of light to a location distal from said source of light, said fiberoptic means comprising a single optical path;
    connection means for attaching said fiberoptic means to said pipe such that one end of said fiberoptic means faces the interior of said pipe;
    a flow-responsive turbine rotatably mounted within said pipe, said turbine having a plurality of blades extending radially outwardly, said blades being angularly offset relative to the axis of fluid flow through said pipe, said fiberoptic means for directing light toward the edge of said blades, each of said blades having a light-reflective surface;
    a collimating lens positioned at the end of said fiberoptic means opposite said source of light, said collimating lens for directing light to and receiving light from said rotating body;
    detector means connected to the end of said fiberoptic means opposite said pipe and arranged so as to receive light from said fiberoptic means, said detector means being responsive to said light from said fiberoptic means as reflected by the blades of said turbine; and
    output means electrically connected to said detector means for producing a signal relative to said light as received by said detector means, said signal corresponding to the flow rate of said fluid passing through said pipe.

2. The device of claim 1, said source of light being a light-emitting diode.

3. The device of claim 2, said source of light being electrically connected to a constant DC current source.

4. The device of claim 1, further comprising:
    beamsplitter means disposed adjacent said source of light, said fiberoptic means, and said detector means, said beamsplitter means for passing light from said source of light to said fiberoptic means and passing said light from said fiberoptic means to said detector means.

5. The device of claim 1, said lens being sealed about the end of said fiberoptic means so as to maintain said fiberoptic means in an environment isolated from said rotating body.

6. The device of claim 1, said detector means further comprising:
    amplifier means electrically connected to said photodetector; and
    pulse shaping means electrically connected to said amplifier means for converting the signal from said amplifier means into a digital pulse.

7. The device of claim 6, said detector means further comprising:
    a transconductance amplifier electrically connected to said photodetector for converting the current from said photodetector into a voltage signal; and
    a Schmitt trigger electrically connected to said amplifier means for converting the wave form of said voltage signal into a square pulse.

8. The device of claim 7, said output means comprising a pulse forming means electrically connected to said Schmitt trigger for providing a constant pulse width from the leading edge of said signal from said Schmitt trigger.

* * * * *